Patented Apr. 22, 1947

2,419,404

UNITED STATES PATENT OFFICE 2,419,404

METHOD FOR HIGHER FATTY ACID POLYAMINE SOAPS

James M. Johnson, New York, N. Y., assignor to Nostrip Inc., a corporation of Delaware No Drawing. Application March 9, 1943, Serial No. 478,585

3 Claims. (Cl. 260—404.5)

This invention relates to a surface active agent and method of making it. More particularly, the invention relates to a road composition including the surface active agent and either petroleum or a bituminous material or both. The invention relates especially to road materials in the form of paving compositions including the said agent, a plastic bituminous material, and a usual type of aggregate, the agent to be incorporated into the bituminous material before application to the aggregate or to be applied to the aggregate before mixing with the bituminous material.

It has previously been found by me that salts (soaps) of di- or other alkylene polyamines with higher fatty acids and particularly such salts of acylamidoamines are useful in improving the coating of paving aggregate or the like by bituminous materials. See copending application for U. S. patent, Serial No. 457,099 filed by James M. Johnson, September 2, 1942. Now I have found that such compositions are made more effective when the polyamine is initially reacted with a weak volatile acidic substance and this substance is later replaced from the composition by heating with the higher fatty acid, to form thus indirectly the fatty acid soap.

The invention comprises the herein described surface active product resulting from and the method of treating a polyamine with a weak volatile acidic substance and then heating the resulting material with the selected higher fatty acid, preferably to a temperature causing loss of water of constitution and formation of a soap of an acylamidoamine. The invention comprises particularly a petroleum oil treating agent or bitumen treating agent consisting of the product so made.

When petroleum oil is mixed with the treating agent, there is obtained an oily product that may be used to advantage as a binder for sand or dirt roads. So applied, the composition forms a good coating, even if applied to sand in wet condition, and is resistant to being washed away by rain.

On incorporating into natural asphalt or like plastic bituminous paving material a treating agent of kind described, there are obtained a number of advantages, even when the proportion of the treating agent used is very low. Thus there is imparted to the bituminous material the property of completely coating either wet or dry aggregates, including the ordinarily very difficultly coatable highly siliceous and weathered aggregates, with which the treated bituminous material is mixed. There are obtained also permanent adhesion of the coating to the aggregate under all climatic and traffic conditions, increase in stability of the bituminous material as measured by the crushing strength of bonded aggregate, and increase in ductility and aging qualities, the latter increase being due probably to a large extent to retarding of oxidation.

In general, the method of making the new agent for lowering surface tension against water is as follows.

The selected polyamine is reacted with and preferably saturated with carbon dioxide, this being an amount of carbon dioxide at least approximately equal to that required theoretically to combine with one amine group to the mol of the amine. Since carbon dioxide is the anhydride of a dibasic acid, this means that there is used at least approximately 0.5 mol of the carbon dioxide for 1 mol of the amine. Suitably carbon dioxide is used in the form of powdered dry ice. This dry ice not only develops the desired carbon dioxide gas but also cools the product and avoids objectionable overheating during the reaction. When substantially no more carbon dioxide is absorbed readily, say at a temperature of about 120° to 200° F., or when the calculated amount of other weak volatile acid has been admixed, there is then added an amount of a higher fatty acid which is in excess of the weak volatile acid used. This means that, when the weak volatile acid is carbon dioxide, there are used at least 2 mols of the higher fatty acid for each mol of the carbon dioxide originally used. The amount of the higher fatty acid used is approximately equivalent to and preferably substantially in excess of the proportion required to form a salt (actually a soap) with at least two of the amine groups in the polyamine. This requires 2 mols of the fatty acid to one of the amine. The whole is then gradually warmed with stirring, to such a temperature as to cause elimination of most if not practically all of the carbon dioxide or other weak volatile acid used and also to cause decomposition of a part of the amine soap, with loss of water of constitution, into an acylamidoamine soap. It is advantageous to heat until there is lost approximately 1 mol of water to each mol of polyamine used originally. The preferred temperature for causing this conversion with loss of water of constitution is about 250° to 300° F. Particularly satisfactory conversions have been obtained at about 340° F.

Using carbon dioxide (which in the presence of water gives carbonic acid), ethylene diamine as the illustrative polyamine, and a higher fatty acid represented by the formula R.COOH, we consider that the reactions may be represented by the following equations:

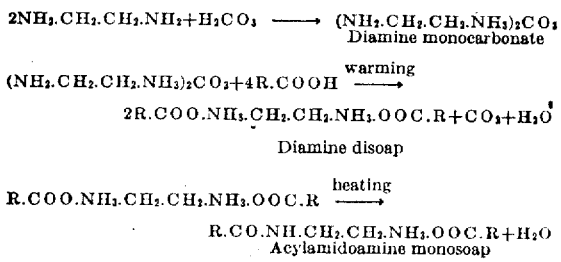

The treating agent so made should be expected to be the same as that made by direct reaction of the higher fatty acid upon the amine and subsequent heating as described, without the intermediate use of the carbon dioxide or other weak volatile acid and subsequent expulsion of it. We have found, however, that the use and subsequent expulsion of the weak volatile acid produces a different final product from that obtained when this step is omitted. Thus the product made with the temporary introduction and then expulsion of carbon dioxide or like weakly acidic volatile substance is much less viscous than when this step is omitted and other conditions of the reaction and heating are kept the same. Thus, the new product at room temperature such as 70° F. is a syrupy pourable liquid mass whereas, without the intermediate use of the weak volatile acid, the product obtained is semipasty and at best difficultly flowable at room temperatures.

Furthermore, our product is more effective than that made from the same amine and higher fatty acid but without the use of carbon dioxide or the like. It is more effective in improving the coating properties of bituminous paving materials in the several points of advantage discussed above. Also the improved agent may be used in lower proportions for a given amount of effect obtained.

While the invention is not limited to any theory of explanation of the effect of the carbon dioxide or like weak acid initially used, it is considered that the use of such acid by being combined temporarily with the amines minimizes undesirable side reactions which unless restricted result in development of objectionable condensation or other by-products from the polyamines.

As the amine to be used there is selected a di-, tri-tetra- or other polyamine, the term poly being used herein to include di. The amine selected must be a polyamine that gives a liquid product in the treatment described. There may be used to advantage such amines including 2 to 10 carbon atoms to the molecule and preferably 2 to 7. Examples of amines that meet these qualifications are ethylene diamine, diethylene triamine, triethylene tetramine, tetraethylene pentamine, the corresponding propylene and butylene compounds, and paraphenylene diamine. In addition to such amines, there may be used also substituted amines, as, for example, hydroxy- ethyl ethylene diamine, hydroxypropyl ethylene diamine, and an alkylamine as, for example, one made by replacing a hydrogen of one or more of the amine groups by an alkyl radical of which methyl, ethyl and propyl are examples. Mixtures of the several amines may be used.

As the volatile acid (acidic substance) which is first introduced and later expelled, carbon dioxide is preferred because of its effectiveness and convenience in use. Sulfur dioxide also is satisfactory.

As the higher fatty acid which is used eventually to replace the volatile acid, there is selected one containing not substantially less than 8 or more than 22 carbon atoms to the molecule. The $C_{12}$ to $C_{18}$ acids are preferable. There may be used such a higher fatty acid in pure form. However, it is economical and entirely satisfactory to use mixed higher fatty acids, as for example, crude or refined talloil and fatty acids from linseed, cottonseed, fish, or corn oil. Crude or refined oleic acid is satisfactory.

The proportions of the several materials to each other may be varied.

Best results are obtained, however, if the volatile acid when a gas is used in practically the saturation quantity or in quantity equivalent to at least one amino radical for each molecule of the polyamine when the volatile acid is not a gas. Thus, we have used to advantage proportions of carbon dioxide, sulfur dioxide, or the like which are practically equivalent to the amount required to neutralize (form a salt) from one amino group to each molecule of the amine. We have used, for example, approximately 40 parts of carbon dioxide as measured by the weight absorbed for each 100 parts on the dry basis of ethylene diamine contained in a solution with 30 parts of water to 70 of the amine, 25 parts for each 100 parts of diethylene triamine, 15 parts for each 100 parts of triethylene tetramine, and 10 parts for each 100 parts of tetraethylene pentamine. In the liberation of the absorbed carbon dioxide or the like the proportion of the higher fatty acid used should be at least approximately equivalent to the amount of the volatile acid absorbed increased by the amount required to form a soap with the second amino group of the polyamine, that is at least 2 mols for each mol of the amine. Better results, including the production of the finished product at lower cost per pound, are obtained when the higher fatty acid used is in large excess of 2 mols. Thus there is used to advantage approximately 10 to 30 parts of higher fatty acid to 1 part of the original amine.

The above proportions are given on the dry basis, although some of the amines and particularly the diamines are frequently available only in the form of solutions containing say 70 parts of the amine to 30 of water. Such solutions are sometimes spoken of as hydrates.

The invention will be further illustrated by detailed description in connection with the following specific examples of the making of a treating agent.

EXAMPLE 1

150 parts of dehydrated crude talloil and 7.2 parts of ethylene diamine (30% water) that has been previously saturated with carbon dioxide (2.6 parts) are mixed together in the cold. A frothy mass is produced. This mass is then heated with stirring until practically all of the carbon dioxide has been volatilized and all of the water originally present has been eliminated. The heating and stirring are continued until there has been expelled an additional 1.5 parts of water created by the decomposition of the amine soap into an acylamidoamine soap of the kind represented by the general formula above. This requires a temperature of about 260° F. The reaction mass is then cooled to room temperature. It is a viscous but readily pourable liquid.

EXAMPLE 2

The procedure of Example 1 is followed execpt that the temperature of heating is 270° to 290° F. and there is used as the amine a mixture of diethylene triamine 50%, triethylene tetramine 25%, and tetraethylene pentamine 25%. The proportion of carbon dioxide used is the saturation quantity, or about 10 to 15 parts for 100 parts of the mixed amines.

EXAMPLE 3

The procedure of Examples 1 or 2 is followed except that sulfur dioxide is substituted for carbon dioxide in the proportion of 64 parts of the former for 44 of the latter.

*Incorporation into asphalt*

A treating agent made as described in any one of the examples above is incorporated into asphalt or other bituminous paving material in any convenient manner, as, for example as follows: 1% is added to the asphalt or tar binder, either straight or after being cut back, and heated with stirring to the temperature of application of the paving material to aggregate, ordinarily about 350° F. for the binder in undiluted condition and 150° F. for the cut backs. The selected proportion, say, about 5 to 7 parts of the bituminous material so treated is added to 100 parts of aggregate which may be wet or dry, hot or cold. The resulting mixture is thoroughly agitated to secure proper coating.

In general, the proportion of the treating agent to be used is ordinarily about 0.7 to 2 parts and usually about 1 to 1.5 parts for 100 parts of the plastic bituminous material.

*Application to aggregate*

In applying the treating agent to the aggregate in advance of adding the asphalt, the following procedure is used. The treating agent is first dissolved in naphtha, benzene, gasoline, or other inert volatile solvent. The solution so made is then stirred with the aggregate until a uniform coating results. Excellent adherence is obtained. Thus the aggregate so treated may be immediately placed under running water and thoroughly washed without removing the treating agent. When mixed with untreated asphalt or tar, the aggregate so treated will adhere to the asphalt or tar, the agent not having been removed by the said washing.

A more specific example of the treatment of the aggregate follows.

Dissolve 10 parts of the treating agent with 90 parts of naphtha. Place 200 parts of stone to be treated in a receptacle and add 0.8 to 1 part of the naphtha solution to the stone. Thoroughly mix the naphtha solution with the stone, so that the naphtha solution is dissiminated over the stone regardless of whether the stone is wet or dry. In field work this can be done by placing the stone in a concrete mixer or pug-mill of any usual type, adding the required amount of the naphtha solution, and mixing thoroughly. The aggregate used may be stone, gravel, slag, sand, or like material. Once the aggregate has been treated with the naphtha solution, the product may be washed with water, exposed to rain, or stored indefinitely without affecting its wetting by bituminous materials.

*Incorporation into oil*

The procedure and proportions described in the section headed "Incorporation into asphalt" are followed except that crude oil, stripped crude oil, or a mixture of asphalt or the like with crude oil or a high boiling fraction thereof is substituted part for part for asphalt. A crude oil containing about 20% or more of asphalt is especially satisfactory.

In mixing the surface active agent into the oil composition, the temperature need be no higher than required for making the mixture easily stirred, say at ordinary temperatures to about 200° F., so as to permit uniform distribution of the agent. With crude oils that have not been stripped of low boiling fractions and are, therefore, free-flowing, the surface active agent is preferably incorporated at about atmospheric temperature.

In order to increase the binding properties of the mixed oil and surface active agent, there is suitably incorporated an oil-soluble resin, as, for example, rosin, ester gum, dammar, or a copal. Proportions that are satisfactory are about 10 to 60 parts of the resin for 100 parts of the oil, 25 to 50 parts ordinarily giving the best results. In mixing and dissolving the resin, the temperature of the whole mixture is preferably maintained at a temperature at least as high as the melting point of the selected resin. Losses of petroleum products and fire and explosion hazards are reduced if the petroleum to be heated to the melting point of the resin is first stripped of low boiling fractions such as kerosene, gasoline, and lower boiling materials.

*Restoration of overheated treating agent*

In case the charge is overheated or the reaction is carried beyond the proper point, then the decomposition of the disoap of the diamine does not stop at the monoacylamidoamine soap but is carried to the diacylamide stage.

I have now found that, in case this occurs, I may convert the amido compound back to the amine soap. This is accomplished by the addition of excess of water at a temperature below that at which the water is rapidly vaporized and then reheating to remove water until calculation or analysis shows that the proportion of water retained in the residual matter corresponds to the water of constitution of the desired acylamidoamine soap.

Thus a charge of the kind described in Example 1 above was heated to about 330° F. with a loss of water corresponding to the free water originally present in the raw materials and 2.5 parts of additional water formed by decomposition of the diamine disoap. The batch was then cooled to a temperature below 212° F., 4 parts of water added and the whole stirred continuously and warmed slowly to about 260° F. until the water loss thus caused amounted to 3 parts. The loss of water of decomposition in the complete process was, therefore, 1.5 parts. The product obtained was the desired acylamidoamine soap.

The product was then cooled promptly.

The changes involved in the proper heating, overheating, and rehydration are considered by me to occur in the manner shown in the following equations using a typical polyamine, ethylene diamine.

In these equations RCO represents the acyl residue of a higher fatty acid, RCOOH, the polyesters here being polysoaps.

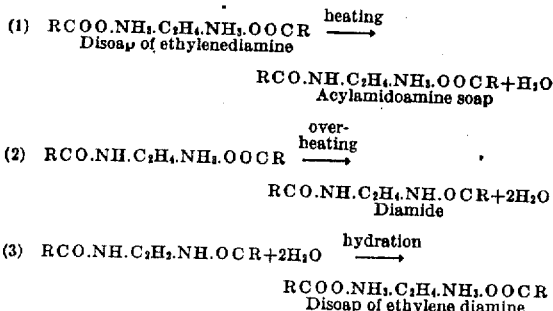

The disoap shown as the final product is then reheated, to give change (1). The material so produced is entirely satisfactory as a treating agent for use with bituminous materials or petroleum as described above.

It will be understood also that it is intended to cover all changes and modifications of the example of the invention herein chosen for the purpose of illustration which do not constitute departures from the spirit and scope of the invention.

What I claim is:

1. In making a surface active agent, the method which comprises reacting an aliphatic polyamine with carbon dioxide in amount at least approximately equal to mol of the polyamine, then mixing the product with a higher fatty acid containing 8 to 22 carbon atoms to the molecule and in amount in excess of two mols for each mol of the carbon dioxide, and heating the resulting mixture to a temperature of at least approximately 250° F. to expel the volatile acidic substance and form a soap of the amine with the higher fatty acid.

2. The method described in claim 1, the proportion of the higher fatty acid being at least approximately equal to 2 mols for 1 mol of the amine, so as to form a disoap and the said heating being continued until water of constitution is lost in amount equal to approximately 1 mol of the water for each mol of the disoap, the loss of water resulting in the formation of a monosoap of acylamidoamine.

3. In making a surface active agent, the method which comprises reacting an aliphatic polyamine with carbon dioxide, in amount approximately equal to that required to saturate the polyamine with carbon dioxide at a temperature of 120° to 200° F., mixing the resulting product with a higher fatty acid in the proportion of at least approximately 2 mols of the higher fatty acid to 1 mol of the amine used initially, heating the resulting mixture to expel the said carbon dioxide and form the disoap of the amine and fatty acid, and continuing the heating to a temperature of about 250° to 300° F., so as to cause loss of a substantial proportion of water but less than 2 mols of water for 1 mol of the disoap so as to form an acylamidoamine soap.

JAMES M. JOHNSON.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,317,959 | Johnson | Apr. 27, 1943 |
| 2,139,679 | Hardy | Dec. 13, 1938 |
| 1,947,951 | Neelmeier et al. | Feb. 20, 1934 |
| 1,534,525 | Hartman | Apr. 21, 1925 |
| 2,345,632 | Robinson et al. | Apr. 4, 1944 |
| 2,291,396 | Lieber | July 28, 1942 |

---

Certificate of Correction

Patent No. 2,419,404.   April 22, 1947.

JAMES M. JOHNSON

It is hereby certified that errors appear in the printed specification of the above numbered patent requiring correction as follows: Column 5, line 68, for "dissiminated" read *disseminated*; column 7, line 35, claim 1, for "equal to mol" read *equal to 0.5 mol for each mol*; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.* ing equations using a typical polyamine, ethylene diamine.

In these equations RCO represents the acyl residue of a higher fatty acid, RCOOH, the polyesters here being polysoaps.

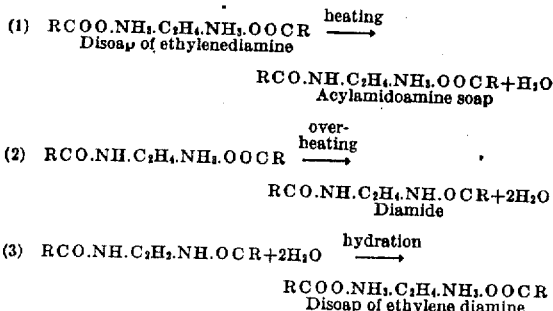

The disoap shown as the final product is then reheated, to give change (1). The material so produced is entirely satisfactory as a treating agent for use with bituminous materials or petroleum as described above.

It will be understood also that it is intended to cover all changes and modifications of the example of the invention herein chosen for the purpose of illustration which do not constitute departures from the spirit and scope of the invention.

What I claim is:

1. In making a surface active agent, the method which comprises reacting an aliphatic polyamine with carbon dioxide in amount at least approximately equal to mol of the polyamine, then mixing the product with a higher fatty acid containing 8 to 22 carbon atoms to the molecule and in amount in excess of two mols for each mol of the carbon dioxide, and heating the resulting mixture to a temperature of at least approximately 250° F. to expel the volatile acidic substance and form a soap of the amine with the higher fatty acid.

2. The method described in claim 1, the proportion of the higher fatty acid being at least approximately equal to 2 mols for 1 mol of the amine, so as to form a disoap and the said heating being continued until water of constitution is lost in amount equal to approximately 1 mol of the water for each mol of the disoap, the loss of water resulting in the formation of a monosoap of acylamidoamine.

3. In making a surface active agent, the method which comprises reacting an aliphatic polyamine with carbon dioxide, in amount approximately equal to that required to saturate the polyamine with carbon dioxide at a temperature of 120° to 200° F., mixing the resulting product with a higher fatty acid in the proportion of at least approximately 2 mols of the higher fatty acid to 1 mol of the amine used initially, heating the resulting mixture to expel the said carbon dioxide and form the disoap of the amine and fatty acid, and continuing the heating to a temperature of about 250° to 300° F., so as to cause loss of a substantial proportion of water but less than 2 mols of water for 1 mol of the disoap so as to form an acylamidoamine soap.

JAMES M. JOHNSON.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,317,959 | Johnson | Apr. 27, 1943 |
| 2,139,679 | Hardy | Dec. 13, 1938 |
| 1,947,951 | Neelmeier et al. | Feb. 20, 1934 |
| 1,534,525 | Hartman | Apr. 21, 1925 |
| 2,345,632 | Robinson et al. | Apr. 4, 1944 |
| 2,291,396 | Lieber | July 28, 1942 |

---

Certificate of Correction

Patent No. 2,419,404.

April 22, 1947.

JAMES M. JOHNSON

It is hereby certified that errors appear in the printed specification of the above numbered patent requiring correction as follows: Column 5, line 68, for "dissiminated" read *disseminated*; column 7, line 35, claim 1, for "equal to mol" read *equal to 0.5 mol for each mol*; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.*